(12) United States Patent
Volkaerts et al.

(10) Patent No.: US 8,054,828 B2
(45) Date of Patent: Nov. 8, 2011

(54) CALL IDENTIFICATION MECHANISM FOR MULTI-PROTOCOL TELEPHONES

(75) Inventors: Paul Volkaerts, Wokingham (GB); Paul Andrew Gelsthorpe, Surrey (GB)

(73) Assignee: Cisco Technology, Inc., San Jose, CA (US)

( * ) Notice: Subject to any disclaimer, the term of this patent is extended or adjusted under 35 U.S.C. 154(b) by 1517 days.

(21) Appl. No.: 11/457,434

(22) Filed: Jul. 13, 2006

(65) Prior Publication Data

US 2009/0028130 A1   Jan. 29, 2009

(51) Int. Cl.
*H04L 12/66* (2006.01)
*H04W 36/00* (2009.01)
*H04M 3/42* (2006.01)

(52) U.S. Cl. ............... 370/352; 455/436; 379/207.15

(58) Field of Classification Search .......... 370/352–356, 370/401; 455/461, 436; 379/114.27, 207.13, 379/207.14, 355.03
See application file for complete search history.

(56) References Cited

U.S. PATENT DOCUMENTS

| | | | |
|---|---|---|---|
| 6,662,006 | B2 | 12/2003 | Glass |
| 6,711,146 | B2 | 3/2004 | Yegoshin |
| 2002/0118800 | A1* | 8/2002 | Martinez et al. ............ 379/67.1 |
| 2002/0145973 | A1* | 10/2002 | Shah et al. ................. 370/220 |
| 2006/0077957 | A1* | 4/2006 | Reddy et al. ............... 370/352 |
| 2006/0276193 | A1* | 12/2006 | Itzkovitz et al. ............ 455/445 |
| 2007/0153771 | A1* | 7/2007 | Doradla et al. ............. 370/352 |

OTHER PUBLICATIONS

Nokia E60 and Nokia E70 Smartphones (Nokia) (Retrieved from: URL: http://europe.nokia.com/BaseProject/Sites/Nokia_Europe_18022/CDA/Categories/Business/MobileApplications/AvayaMobileforS60Platform/AvayaMobileforS60PlatformCompatibility/_Content/_Static_Files/nokia_and_avaya_voipdatasheet.pdf) (Copyright 2005 Nokia; Posted on Internet Feb. 5, 2006).

* cited by examiner

*Primary Examiner* — Melanie Jagannathan
*Assistant Examiner* — Joel Hamel
(74) *Attorney, Agent, or Firm* — Stolowitz Ford Cowger LLP

(57) ABSTRACT

In one embodiment, a system identifies an Internet Protocol (IP) device as a calling party for calls from either a Voice over Internet Protocol (VoIP) portion or a cellular portion of a multi-protocol phone. As a result, return calls to the multi-protocol phone are always sent through an IP device to allow call handling or Single Number Reach (SNR) functionality for the return calls.

15 Claims, 4 Drawing Sheets

2

CALL IDENTIFICATION MECHANISM FOR MULTI-PROTOCOL TELEPHONES

BACKGROUND OF THE INVENTION

This invention relates generally to cellular telephones and more particularly to cellular capable multi-protocol telephones.

Mobile phones use cellular networks operating according to Global System for Mobile Communication (GSM) or Code-Division Multiple Access (CDMA) to send and receive calls. Although these cellular networks are widely accessible, calls made over these cellular networks are generally more expensive and cannot accommodate as many calling features as other types of networks.

In contrast, calls made over other networks such as Internet Protocol (IP) networks used to carry Voice over Internet Protocol (VoIP) are less expensive and support more extensive calling features than calls made over cellular networks. However, these IP networks are not always as accessible as cellular networks.

Accordingly, multi-protocol telephones have been developed that select which network is used to send or receive a phone call depending on network accessibility. These multi-protocol telephones are generally provisioned with two different telephone numbers to facilitate use with a cellular network and an IP network. When an IP network is accessible, a call is made over the IP network from the VoIP phone number; otherwise the cellular network carries the call made from the cellular phone number.

FIG. 1 shows an example operation of a prior art multi-protocol phone 30. The phone 30 has a cell phone number 96 and a VoIP phone number 97. When the cell phone portion of the phone 30 is used to call endpoint B, the call 98A travels over the cellular network 60. When the VoIP portion of the phone 30 is used to call endpoint B, the call 99 travels over the IP network 61.

Call-handling functions for the multi-protocol telephone 30 are facilitated by call-handling device 15 located at a VoIP service provider for phone 30. In order for the call-handling device 15 to provide these call-handling functions for an active incoming call, the incoming call to the multi-protocol phone 30 must be first received at the call-handling device 15. In other words, call-handling functions cannot be applied to incoming telephone calls directed to the cell phone number 96 for the multi-protocol telephone 30. Moreover, the call-handling device 15 provides Single Number Reach (SNR) functionality that is only available to incoming calls routed through the call-handling device 15.

Although all incoming IP calls are routed through call-handling device 15, incoming calls directly to the cell phone number 96 bypass the call-handling device 15. A problem can occur when the cellular portion of multi-protocol telephone 30 is used to make the call 98A over the cellular network 60 to the endpoint B. The cellular network 60 detects the telephone number 96 for the cellular portion of the multi-protocol telephone 30 and provides that originating telephone number 96 to the endpoint B via a Calling Line Identification (CLI) field. A person at the called endpoint may then use the cellular telephone number 96 provided by the CLI field to make a return call 98B. As a result, the return call 98B bypasses the call-handling device 15 and the multi-protocol phone 30 is denied call-handling features and SNR functionality for the duration of the returned call 98B.

One proposed partial solution requires all outbound mobile calls from the multi-protocol phone to automatically connect with the call-handling device at the VoIP service provider before being delivered to an endpoint. As a result, a call-handling device phone number for the multi-protocol phone is included in a CLI field for the call. The called party can then use the call-handling device phone number located in the CLI field to return the call to the call-handling device for the multi-protocol phone. Solutions involving connecting all outbound calls to the call-handling device are expensive to deploy and generally require new hardware in the cell phone and/or the call handling device. For these and other reasons, such solutions generally have not been accepted by the industry.

It is known that one can use Presentation CLI to allow an enterprise having several employees, each with their own direct telephone number, to make outbound calls that present a toll free "1-800" billing number for the enterprise in a CLI field of the outbound call. For example, a cellular network assigns the billing number to the CLI field of any calls from any of the employees' cellular telephones. This functionality allows the enterprise to mask the employees' telephone numbers so that returned calls are directed to a call center for the billing number. The use of Presentation CLI has generally been limited to the above-described example.

Accordingly, multi-protocol telephones having cellular capability currently do not fully support SNR and do not fully integrate with call-handling functionality. The disclosure that follows solves these and other problems.

DETAILED DESCRIPTION

Figure 1:
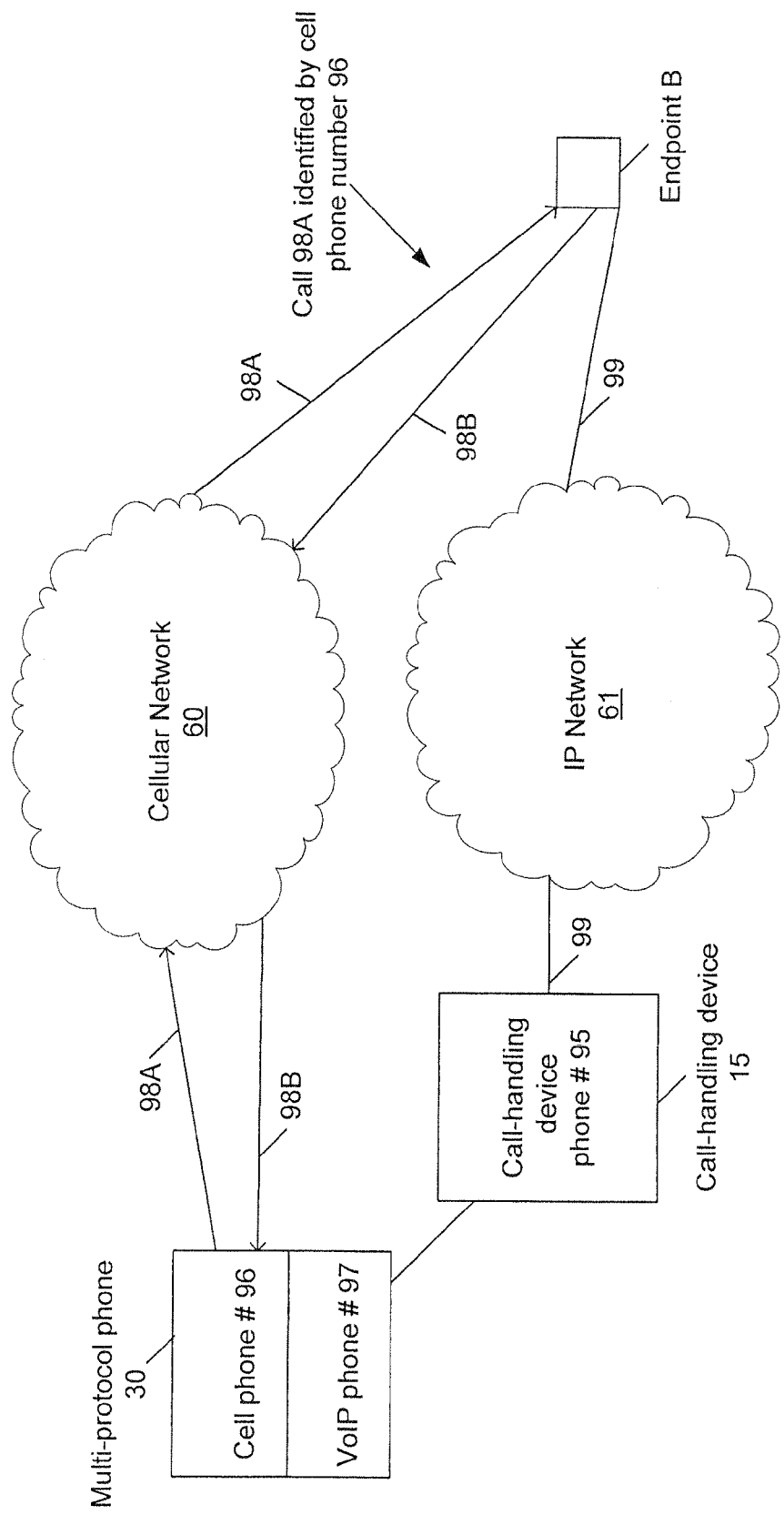
FIG. 1 is a diagram showing prior art multi-protocol phone operation.
Figure 2:
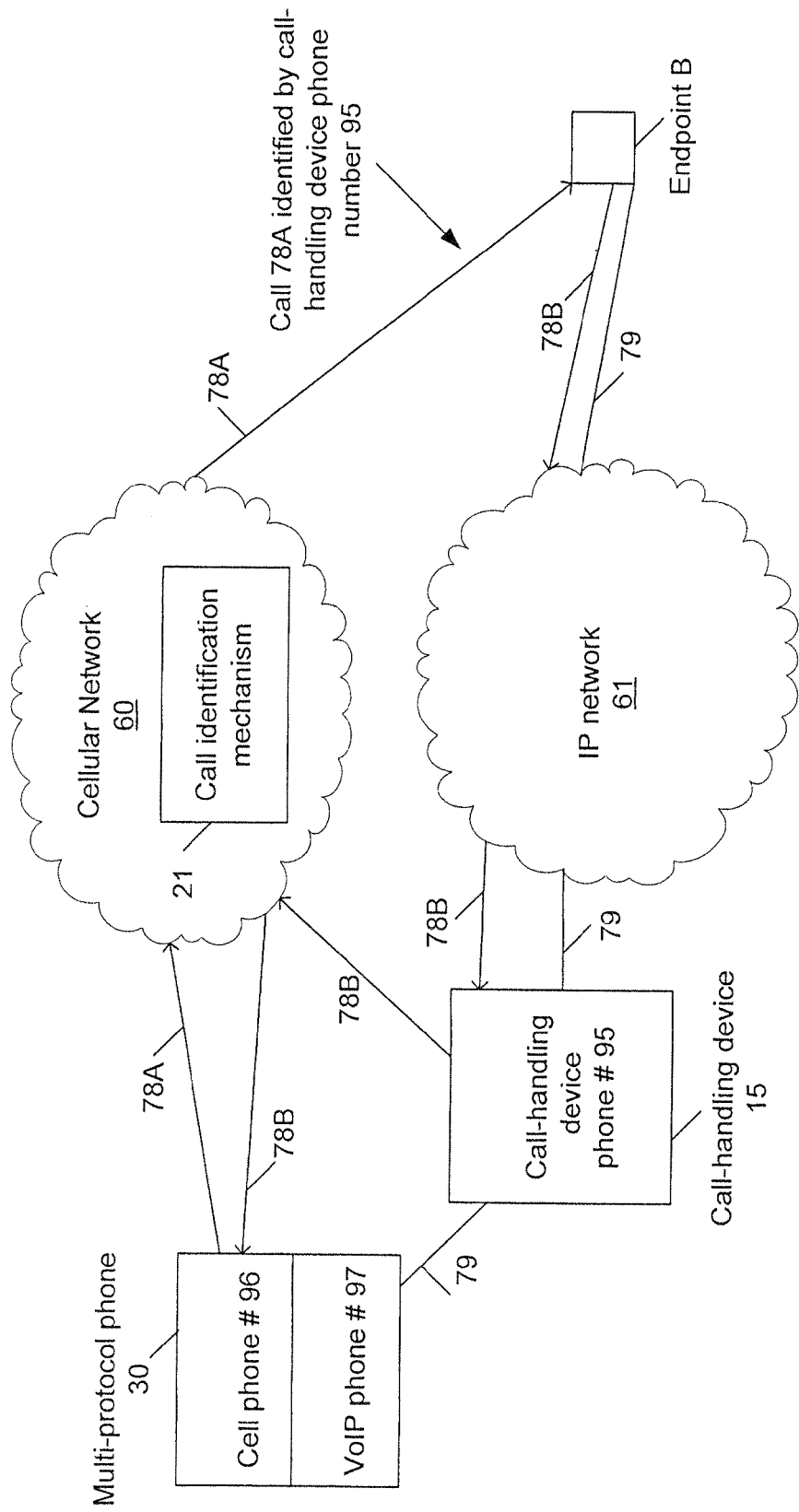
FIG. 2 is a diagram showing a system that leverages a Presentation CLI table so that all calls from a multi-protocol phone are identified by a call-handling phone number.

FIG. 2 is a diagram showing a system that leverages a Presentation Calling Line Identification (CLI) table so that all calls from a multi-protocol phone are identified by a call-handling device phone number.

Referring to FIG. 2, an Internet Protocol (IP) call 79 originating from a Voice over IP (VoIP) portion of multi-protocol phone 30 is routed through call-handling device 15. As a result, IP call 79 identifies the phone number 95 for call-handling device 15 to endpoint B so that return calls are sent back to call-handling device 15.

Likewise, when cellular call 78A is sent from the cellular portion of multi-protocol phone 30, the phone number 95 for call-handling device 15 is also identified to endpoint B. Cellular network 60 receives the cellular call 78A and a call identification mechanism 21 includes call-handling device phone number 95 in a Calling Line Identification (CLI) field for the call 78A.

When endpoint B returns the call 78A, the return call 78B is directed to the phone number 95 identified in call 78A. Therefore, return calls for both the IP and the cellular call are directed to call-handling device 15 so that call-handling functions and Single Number Reach (SNR) functions may be provided for all return calls.

Figure 3:
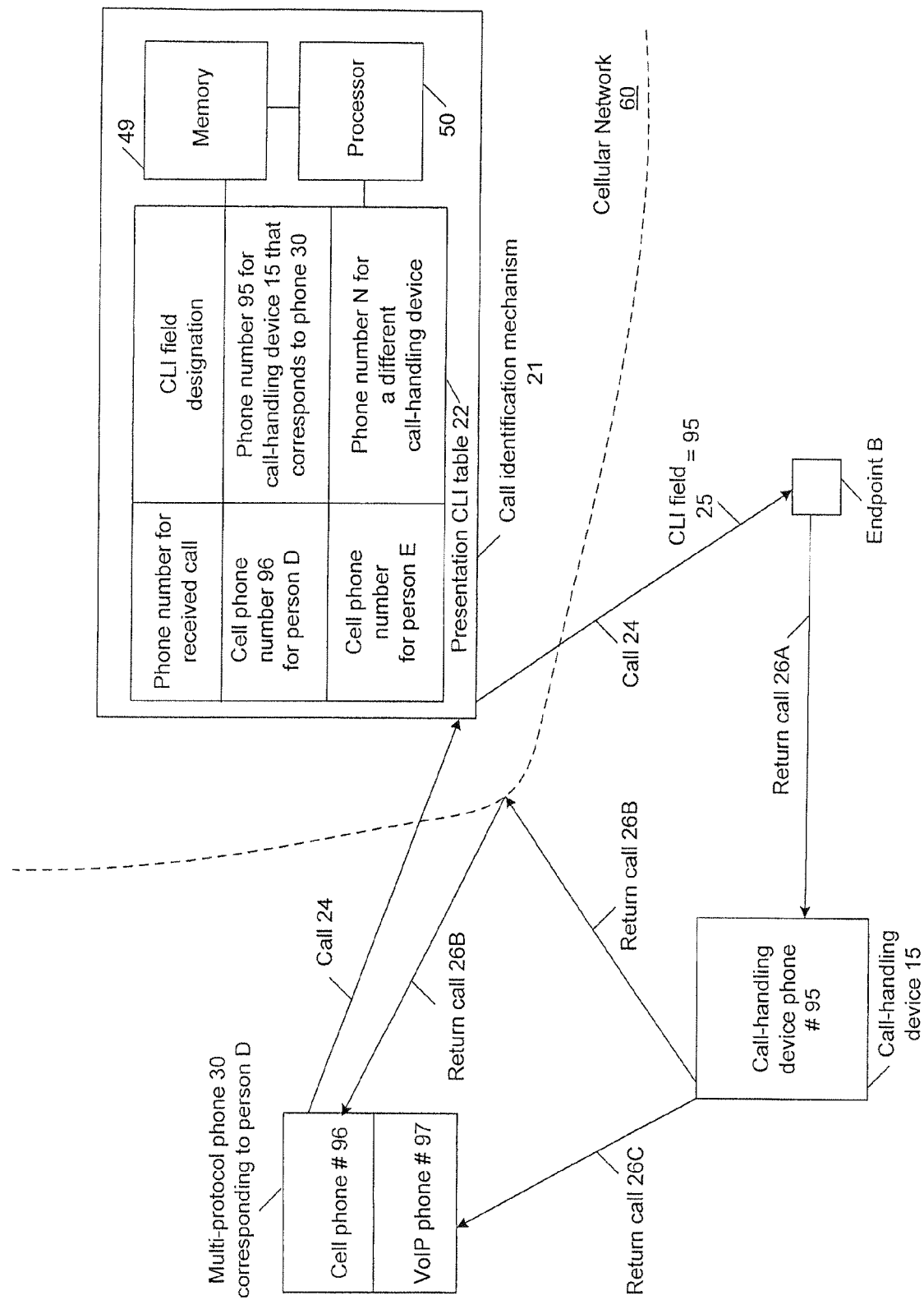
FIG. 3 is a detailed diagram showing the call identification mechanism in FIG. 2 that associates a mobile phone number with a call-handling device phone number.

FIG. 3 is a detailed diagram showing the call identification mechanism 21 having a processor 50, a memory 49 and a Presentation CLI table 22. To improve multi-protocol phone functionality, the mechanism 21 leverages the Presentation CLI table 22 to associate cellular phone numbers with IP device phone numbers for IP devices such as call-handling device 15. Accordingly, calls made by a cellular phone identify an IP device phone number in a CLI field 25 rather than a cell phone number. The memory 49 includes instructions that, when executed by the processor 50, perform the functions described in the flowcharts of FIG. 4.

Referring to FIG. 3, the Presentation CLI table 22 associates the cellular phone number 96 with the phone number 95 for the IP device 15. In the present embodiment, the IP device 15 is a call-handling device 15 located at a VoIP service provider for multi-protocol phone 30. In other embodiments, the IP device 15 may be a call manager or any device having a local SNR application. In some embodiments, for example when an SNR application is used, phone number 95 may be the same as phone number 97 for the VoIP portion of multi-protocol phone 30 while in other embodiments phone number 95 and phone number 97 are different. In yet other embodiments, the device 15 may operate according to protocols for other networks besides IP networks such as Integrated Services Digital Networks (ISDNs) or any other public or private networks used to carry phone calls. In still other embodiments, there is no call handling device for the multi-protocol phone 30 and the VoIP phone number 97 may be identified in cellular calls so that return calls are routed to the VoIP phone number 97 for the phone 30 to reduce cellular network usage.

When providing SNR functionality, the IP device 15 may receive incoming calls and then communicate with a local SNR application such as Cisco Mobility Manager or Mobile Connect to determine which of telephone numbers 96 or 97 should receive the call. For example, during the working hours of day the SNR application may direct all calls to the VoIP telephone number 97. At all other times of day, the SNR application may direct all calls to the cell phone number 96.

When the call-handling device 15 provides call-handling functionality, the call-handling device 15 may move an active call from the cellular network 60 to a public or private IP network mid-call based on WiFi accessibility with an IP network to reduce call costs and add call features for the call. Other call-handling functions may be provided by the IP device 15.

In an example operation, person D uses the cell phone function of multi-protocol phone 30 to initiate call 24 to endpoint B. In this embodiment, multi-protocol phone 30 includes VoIP capability and WiFi capability in addition to cellular capability. In other embodiments, the multi-protocol phone 30 may also include Signaling System 7 (SS7) capability, ISDN capability, Publicly Switched Telephone Network (PSTN) capability, etc. in addition to cellular capability.

When call 24 is received by the cellular network 60, mechanism 21 identifies an origination source for the call 24 as cell phone number 96 associated with person D. Next, mechanism 21 accesses Presentation CLI table 22 to determine a call-handling device telephone number 95 to be included in the CLI field 25 for call 24. According to the Presentation CLI table 22, the mechanism 21 includes the call-handling device phone number 95 in the CLI field 25 of call 24. In other embodiments, the mechanism 21 identifies the call-handling device 15 as the calling party by using any other method such as Automatic Number Identification (ANI).

The table 22 may include other entries such as an entry for person E having a different multi-protocol phone. In some embodiments, the Presentation CLI table 22 may be a database or a profile.

When endpoint B receives the call 24, the CLI field 25 may be accessed to determine a calling party. Endpoint B determines that the calling party may be reached at telephone number 95. Thus, when a user at endpoint B returns the call 24, the return call 26A is received at the call-handling device 15 having the phone number 95.

When the return call 26A is received, the call-handling device 15 communicates with a local SNR application to determine whether the return call 26A should be directed to cell phone number 96 or VoIP phone number 97. When the SNR application indicates that return calls should be received at cell phone number 96, the return call 26B is transmitted over the cellular network 60 to multi-protocol phone 30. When the SNR application indicates that return calls should be received at VoIP phone number 97, and when the multi-protocol phone 30 is accessible with an IP network, return call 26C is transmitted over the IP network to multi-protocol phone 30.

The return call 26B is finally received at multi-protocol phone 30. The call path for the return call 26A/26B extends through call-handling device 15; therefore, the return call 26A/26B may later be switched between cellular and IP networks mid-call by call-handling device 15. For example, when person D arrives in range of a WiFi network wirelessly coupled to the call-handling device 15, the return call 26A/26B may be partly or completely moved from the cellular network 60 to an IP network. Similarly, the call path for return call 26A/26C also extends through call-handling device 15 and therefore can be moved between cellular and IP networks mid-call.

Figure 4:
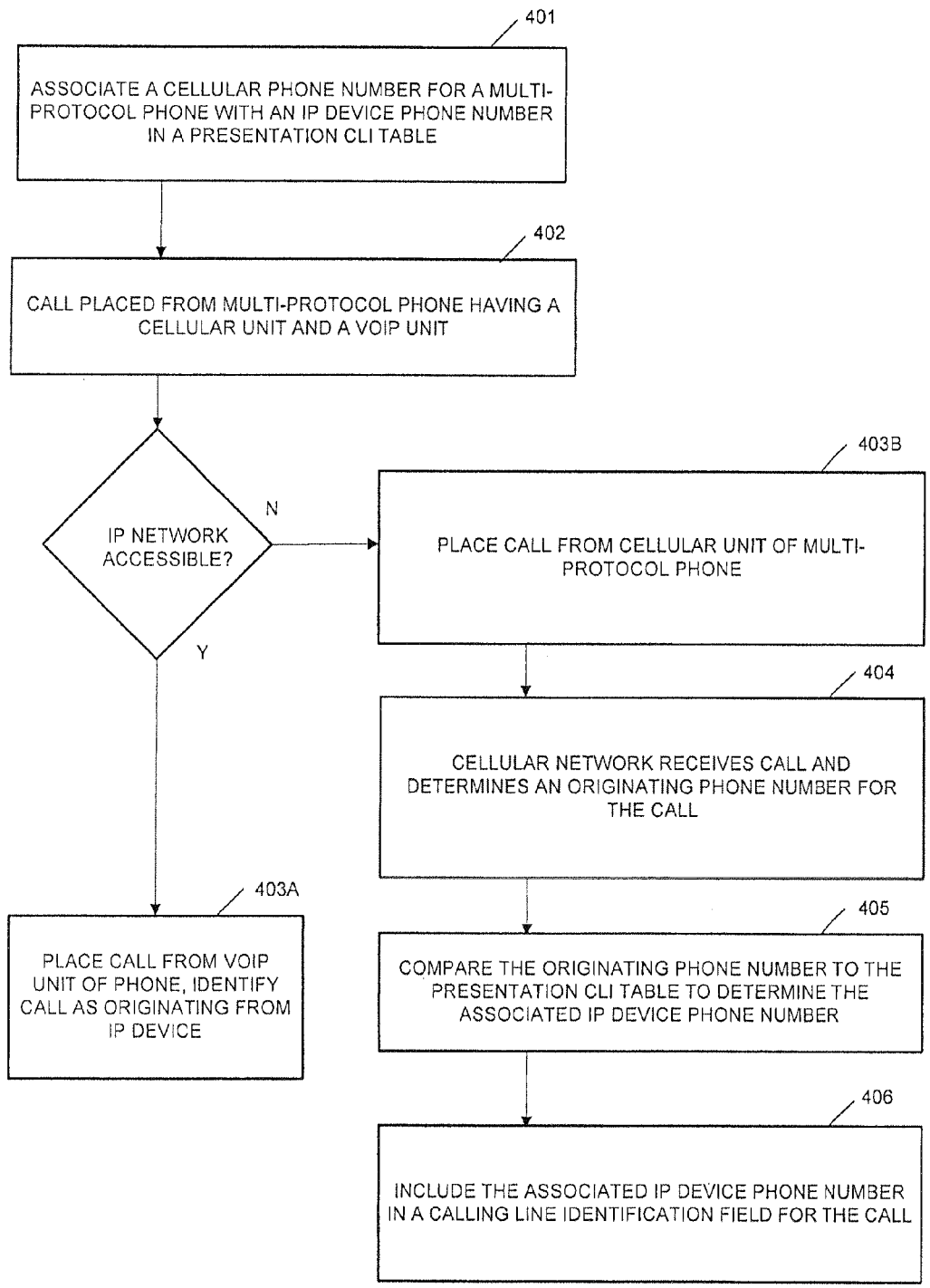
FIG. 4 is a flowchart showing how the call identification mechanism in FIG. 3 provides the call-handling device phone number for calls from the user.

FIG. 4 is a flowchart showing how the call identification mechanism 21 in FIG. 3 provides a call-handling device phone number for calls originating from a cellular phone number.

The mechanism 21 in block 401 associates a cell phone number for a multi-protocol phone with an IP device phone number in a Presentation CLI table. In block 402, a call is placed from a multi-protocol phone having a cellular portion and a VoIP portion. When an IP network is accessible, the call is sent from the VoIP portion of the phone in block 403A. The VoIP call is then routed through an IP device and thus the VoIP call identifies a phone number for the IP device.

When the IP network is not accessible, the call is placed from the cellular portion of the multi-protocol phone in block 403B. In block 404 a cellular network receives the cellular call and determines an originating phone number for the call. The mechanism 21 compares the originating phone number to the Presentation CLI table to determine the associated IP device phone number in block 405. In block 406 the mechanism 21 includes the associated IP device phone number in a CLI field for the cellular call.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A method, comprising:
    initiating an outbound telephone call from an Internet Protocol (IP) portion of a mobile telephone when an IP network is wirelessly accessible by the mobile telephone, said outbound telephone call passing through an IP device and over the IP network;
    identifying a telephone number for the IP device as a calling party for the outbound IP telephone call;
    initiating an outbound telephone call from a cellular portion of the mobile telephone when the IP network is not wirelessly accessible by the mobile telephone, said outbound cellular telephone call being initiated over a cellular network and bypassing the IP device; and
    identifying the telephone number of the bypassed IP device as the calling party for the outbound cellular telephone call, wherein the outbound cellular telephone call that bypasses the IP device lists the telephone number of the IP device wherein the IP device does not reside within the mobile telephone.

2. The method of claim 1, wherein the IP device telephone number is identified as the calling party in response to a determination by a cellular network forwarding device that an originating cellular telephone number for the cellular portion of the mobile telephone is associated with the IP device telephone number in a Presentation Calling Line Identification (CLI) table.

3. The method of claim 2, further comprising:
    receiving a return inbound telephone call at the IP device telephone number; and
    sending the return inbound telephone call over the cellular network to the cellular telephone number when the mobile telephone is not wirelessly accessible over the IP network.

4. The method of claim 3, further comprising moving the return inbound telephone call from the cellular network to the IP network when the mobile telephone becomes wirelessly accessible over the IP network.

5. The method of claim 4, further comprising:
    dialing the return inbound telephone call using the IP device telephone number that is identified as the calling party; and
    terminating the return inbound telephone call at the cellular telephone number.

6. The method of claim 5, wherein the Presentation CLI table includes entries associating telephone numbers for a plurality of different single protocol telephones with a single billing telephone number.

7. A method, comprising:
    analyzing a cellular telephone call entering a cellular network to determine that a cellular telephone number corresponds to an origination source for the cellular telephone call, the cellular telephone call originating from a cellular portion of a mobile telephone;
    comparing said cellular telephone number to a table to determine an associated Internet Protocol (IP) device telephone number for the cellular telephone call, wherein the associated IP device telephone number is for an IP device of an IP network;
    initiating said cellular telephone call over the cellular network, wherein said cellular telephone call bypasses the IP device of the IP network; and
    providing the IP device telephone number as a callback telephone number of the cellular telephone call that bypasses the IP device wherein the IP device does not reside within the mobile telephone.

8. The method of claim 7, further including forwarding a return telephone call from the IP device telephone number to the cellular telephone number over the cellular network.

9. The method of claim 8, further including transferring the return telephone call from the cellular network to the IP network while the return telephone call is in progress.

10. The method of claim 7, wherein the table is a Presentation Calling Line Identification (CLI) table including entries associating telephone numbers for a plurality of different telephone numbers for single protocol telephones with a single toll free billing telephone number.

11. The method of claim 7, wherein the cellular telephone number corresponds to a multi-protocol telephone that makes calls according to both IP and Global System for Mobile Communication (GSM) or Code-Division Multiple Access (CDMA).

12. An apparatus, comprising:
    one or more processors; and
    a memory coupled to the one or more processors comprising instructions executable by the processors, the processors operable when executing the instructions to:
    receive an outbound telephone call from a multi-protocol telephone over a cellular network, the outbound telephone call originating from a cellular portion of the multi-protocol telephone;
    identify a cellular telephone number for the multi-protocol telephone as an originating telephone number for the outbound telephone call;
    compare the identified originating telephone number to a table to determine an associated Internet Protocol (IP) device telephone number for an IP device configured to dynamically remove an incoming telephone call from the cellular network during the incoming telephone call;
    include the IP device telephone number in a call identification field for the outbound telephone call; and
    communicate the outbound telephone call having the IP device telephone number in the call identification field over the cellular network, wherein said outbound telephone call that bypasses the IP device lists the telephone number of the IP device wherein the IP device does not reside within the multi-protocol telephone.

13. The apparatus according to claim 12, wherein the table is a Presentation Calling Line Identification (CLI) table and the cellular telephone number and the IP device telephone number both correspond to one person that is a caller for the outbound telephone call.

14. The apparatus according to claim 13, wherein a return telephone call from a destination of the outbound cellular telephone call is directed to the IP device corresponding to the IP device telephone number included in the call identification field.

15. The apparatus according to claim 1, wherein the IP device directs the return telephone call to the cellular telephone number or a Voice over Internet Protocol (VoIP) telephone number for the multi-protocol telephone in response to an indication from a local Single Number Reach (SNR) application.

* * * * *